United States Patent [19]

Meuschel

[11] 4,157,820
[45] Jun. 12, 1979

[54] CLAMPING MEANS FOR WORKPIECES

[75] Inventor: Dieter Meuschel, Leimen, Fed. Rep. of Germany

[73] Assignee: Heidelberger Druckmachinen, Heidelberg, Fed. Rep. of Germany

[21] Appl. No.: 881,149

[22] Filed: Feb. 27, 1978

Related U.S. Application Data

[63] Continuation of Ser. No. 727,144, Sep. 27, 1976, abandoned.

[30] Foreign Application Priority Data

Sep. 27, 1975 [DE] Fed. Rep. of Germany ....... 2543299

[51] Int. Cl.$^2$ .............................................. B23Q 3/00
[52] U.S. Cl. ................................ 269/319; 269/321 W; 428/582; 428/598
[58] Field of Search ............... 269/105, 265, 297, 303, 269/315, 319, 321 W; 279/123; 428/582, 577, 598

[56] References Cited

U.S. PATENT DOCUMENTS 621022 3/1899 Boal ..................................... 269/105

FOREIGN PATENT DOCUMENTS 2032775 7/1975 Fed. Rep. of Germany ........... 428/582

*Primary Examiner*—Robert C. Watson
*Attorney, Agent, or Firm*—Herbert L. Lerner

[57] ABSTRACT

Clamping means for workpieces of different shape, includes a clamping member firmly connected to at least one workpiece and being receivable and clampable in a clamping device, the clamping member being integral with the at least one workpiece and being formed of narrow web-like bridges, and three support cams disposed at extremities of the bridges outside the at least one workpiece, the support cams being located at respective vertices of an imaginary triangle.

5 Claims, 6 Drawing Figures

CLAMPING MEANS FOR WORKPIECES

This is a continuation of application Ser. No. 727,144, filed Sept. 27, 1976, now abandoned.

The invention relates to clamping means for workpieces of different shape, the clamping means having a clamping member firmly connected to the workpiece or workpieces and being receivable and clampable in a clamping device, the clamping member being integral with the workpiece or a plurality thereof with narrow web-like bridges formed by casting, forging or welding.

Clamping means of this general type are known from German Published Prosecuted Application DT-AS No. 2,032,775. The clamping frame described therein may have an arcuate or rectangular shape surrounding the workpiece or workpieces to be machined. Four cams serve as a support for the clamping frame with workpieces, the latter being oriented and brought into position for machining by the four cams.

Such heretofore known clamping means have the disadvantage that the four support cams must be very accurately machined in order to ensure an exact support on the workpiece holder. The accuracy and machining quality of the finished workpiece depends to a great extent upon the support.

A further disadvantage of the heretofore known clamping means is that a very great amount of material is required for the relatively sturdy and heavy clamping frame which can be used only as scrap following separation thereof from the workpiece or workpieces after completion of the machining operation. Also, the rather large part of the weight represented by the clamping frame poses an additional burden for the transport means.

It is accordingly an object of the invention to provide clamping means for workpieces of different shape which avoid this foregoing disadvantages of the heretofore known clamping means of the general type and which more specifically, requires no machining of the support cams and which minimizes the outlay for adddi- tional material and the cost of transportation.

With the foregoing and other objects in view, there is provided, in accordance with the invention, clamping means for workpieces of different shape, comprising a clamping member firmly connected to at least one workpiece and being receivable and clampable in a clamping device, the clamping member being integral with the at least one workpiece and being formed of narrow web-like bridges, and three support cams disposed at extremities of the bridges outside the at least one workpiece, the support cams being located at respective vertices of an imaginary triangle.

Clamping means constructed in the foregoing manner require no machining of the support cams because the three-point contact ensures an exact statically defined support. Furthermore, the clamping means of the invention requires no additional frame, but rather, utilizes the workpiece or workpieces per se for stabilization. Also, the spacing of the three support cams from one another is freely selectable and can be suited to the dimensions of every clamping device.

In accordance with another feature of the invention, the three support cams have respective support faces extending in the same direction, a first and a second support cam of the three support cams having first bearing faces extending in the same direction and perpendicularly to the support faces thereof, one of the first and second support cams having a second bearing face extending perpendicularly to the first bearing faces. With these bearing faces, a reliable, geometrically defined clamping of the workpiece or workpieces that are to be processed in the machine is assured.

In accordance with an added feature of the invention, the third support cam of the three support cams is disposed at a location spaced from the first and second support cams on the opposite side from the first bearing faces thereof, the third support cam being formed with a laterally offset objection.

In accordance with yet another feature of the invention, the clamping means is in combination with a clamping device comprising a retaining pin engageable with the laterally offset projection of the third support cam. Faulty insertion of the clamping means into the clamping device is thereby avoided.

In accordance with an additional feature of the invention, the clamping means is in combination with a clamping device comprising respective bearing members engageable with the first bearing faces of the first and second support cams, the second bearing face of the one of the first and second support cams, and the laterally offset projection.

Other features which are considered as characteristic for the invention are set forth in the appended claims.

Although the invention is illustrated and described herein as embodied in clamping means for workpieces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
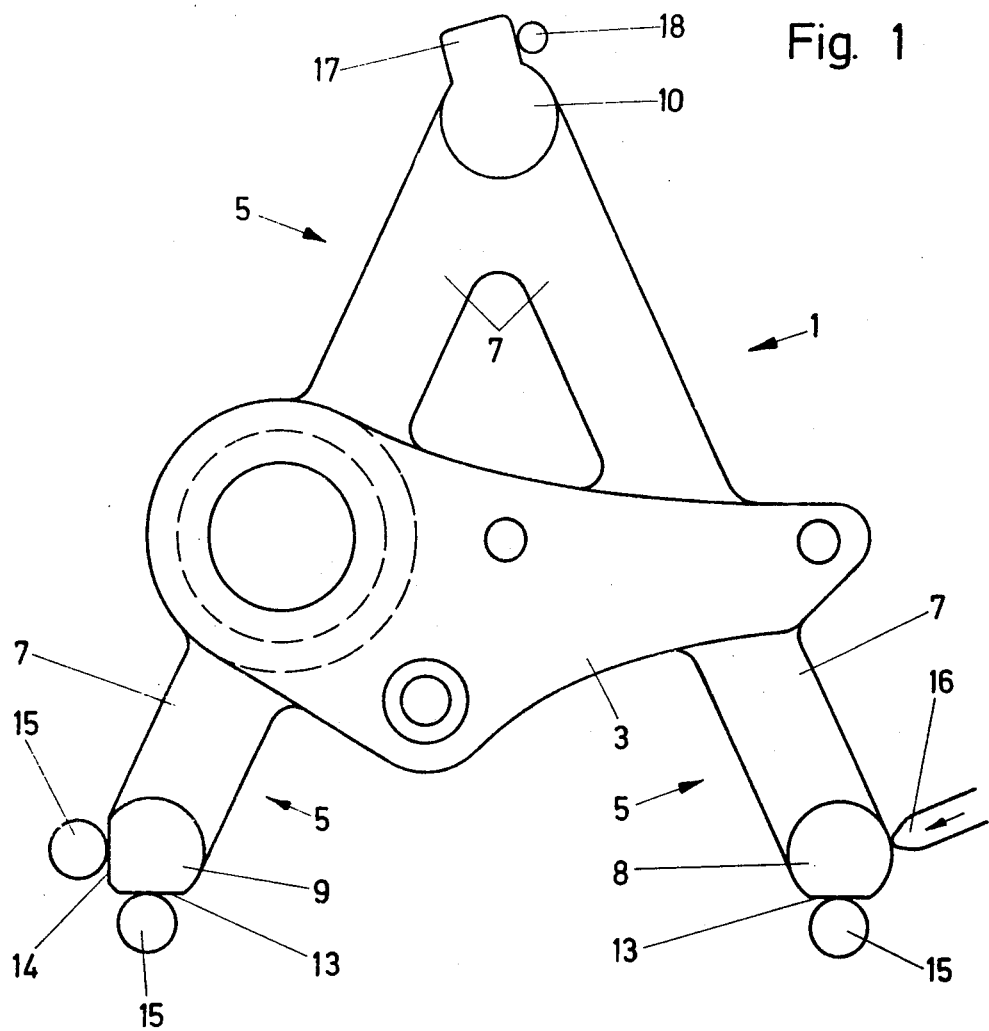
FIGS. 1 and 2 are top plan and side elevational views, respectively, of a first embodiment of the clamping means of the invention having one workpiece integral therewith.
Figure 3:
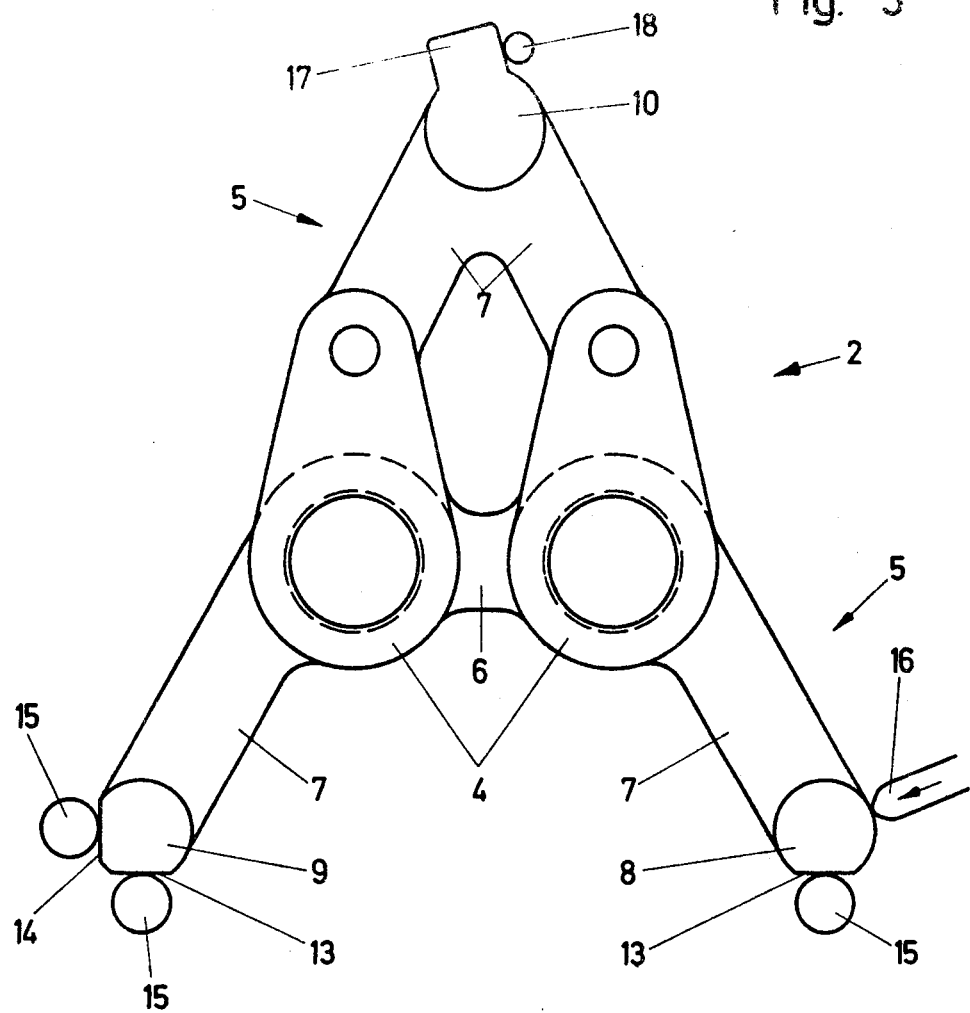
FIGS. 3 and 4 are top plan and side elevational views, respectively, of a second embodiment of the clamping means of the invention having two workpieces integral therewith.
Figure 5:
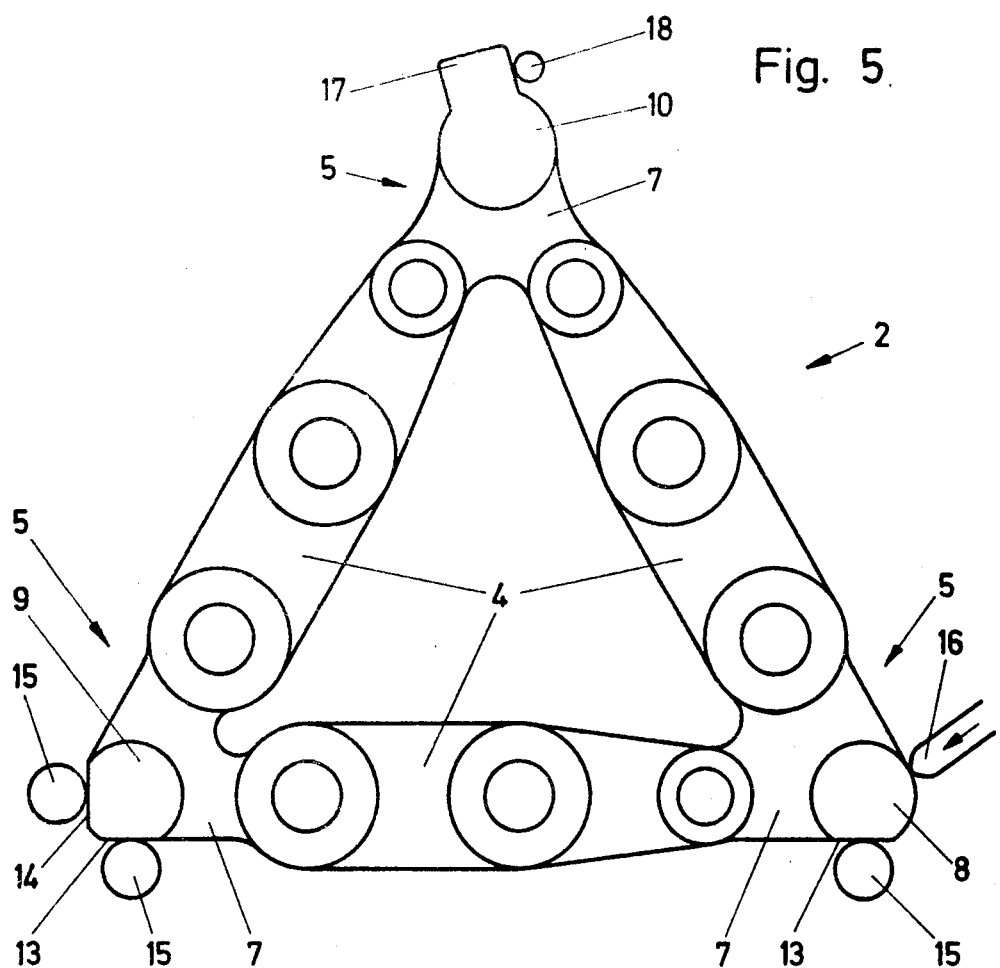
FIGS. 5 and 6 are top plan and side elevational views, respectively, of a third embodiment of the clamping means of the invention having three workpieces integral therewith.

Referring now to the drawings there are shown therein clamping means 1 or 2 constructed in accordance with the invention, having a clamping member 5 firmly connected to a workpiece 3 or workpieces 4 so as to form an integral structure, the clamping means 1 or 2 being receivable and clampable in a clamping device shown only in part in the drawings. FIG. 1 shows clamping means including one workpiece 3, FIGS. 3 and 5 respectively including two and three workpieces 4, forming a unit with the clamping member 5. The workpieces 4 are connected one to the other by a web-like bridge 6 (FIG. 3).

Figure 2:
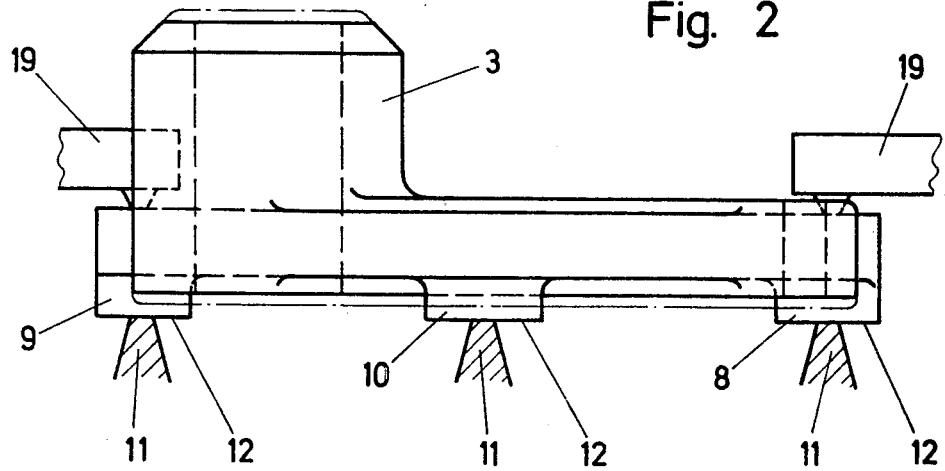
Figure 4:
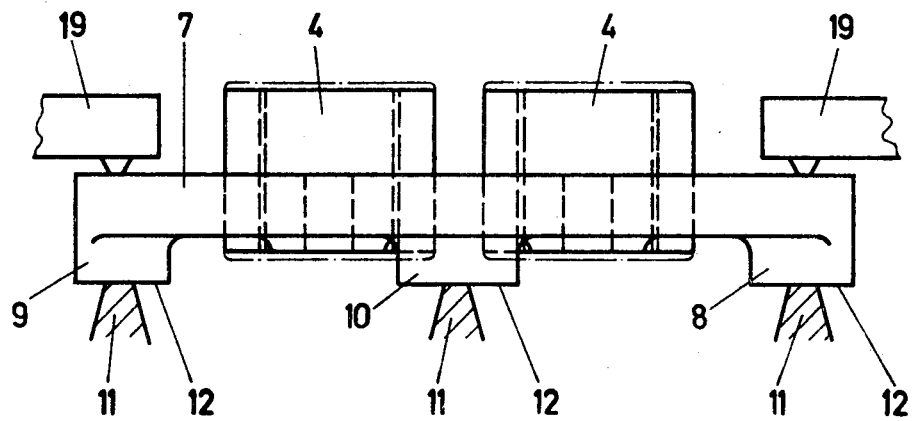
Figure 6:
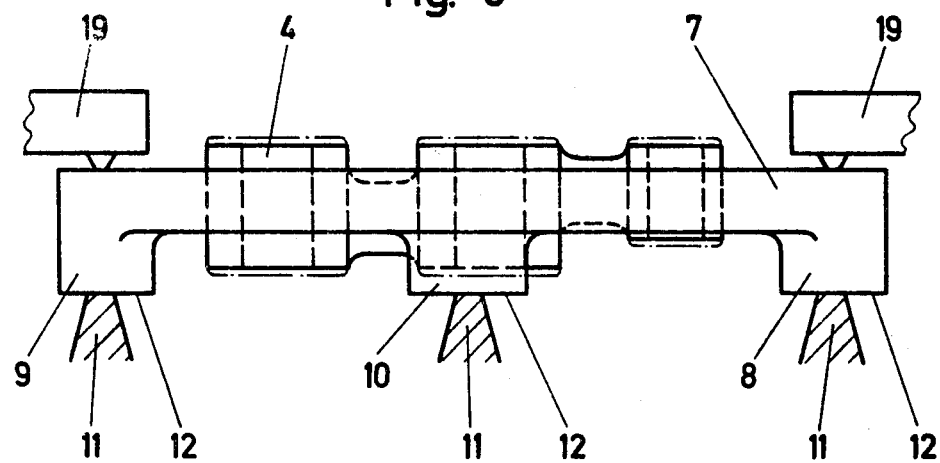

The workpiece 3 and the workpieces 4 that are connected one to another are connected by web-like bridges 7 to three support cams 8, 9 and 10 which are located outside the workpiece 3 or workpieces 4 at respective vertices of an imaginary triangle. As shown in FIGS. 2, 4 and 6, the support cams 8, 9 and 10 project a given distance beyond one side of the workpiece 3 or workpieces 4 that are to be machined and are supported on support points 11 of a further non-illustrated clamping device.

The support cams 8 and 9 are formed with respective bearing faces 13 extending perpendicularly to respective support faces 12 thereof by which they are supported on the support points 11. The support cam 9 is additionally formed with another bearing face 14 (FIGS. 1, 3 and 5) extending perpendicularly to both bearing faces 13, as viewed in the plane in which the support faces 12 are disposed, namely, in the plane of the drawing of FIGS. 1, 3 and 5. The bearing faces 13 and 14 engage or bear against lateral edges of respective pins or bolts 15 that are fastened in the otherwise non-illustrated clamping device. In addition, a spring bolt or pin 16 of the otherwise non-illustrated clamping device presses the bearing faces 13 and 14 of the clamping means 1 or 2 against the respective pins or bolts 15.

In order to avoid faulty insertion of the clamping means 1 or 2 into the sketchily illustrated clamping device, the support cam 10, disposed at a location spaced from the support cams 8 and 9 on the opposite side from the respective bearing faces 13 thereof, is provided with a laterally offset projection 17 with which a retaining pin 18 fastened to the otherwise non-illustrated clamping device is associated. The instant the clamping means 1 or 2 with the respective workpiece 3 or workpieces 4 are inserted into the clamping device, the support cams 8, 9 and 10 are tightly clamped on the support points 11 by means of clamping paws 19 (FIGS. 2, 4 and 6). The workpiece 3 or the workpieces 4 can then be machined. After completion of the machining operation or operations, the bridges 6 and 7, formed of cast, forged or weld metal, for example, are separated directly at the completed workpiece 3 or workpieces 4.

There are claimed:

1. Clamping means for workpieces of different shape, comprising a clamping member firmly connected to at least one workpiece and being receivable and clampable in a clamping device, said clamping member forming an integral structure with the at least one workpiece and comprising a plurality of narrow web-like bridges being disposed along at least two legs of an imaginary triangle and three support cams disposed at extremities of said bridges outside the at least one workpiece, said three support cams being located at respective vertices of said imaginary triangle and being clampingly engageable in a three-point contact in the clamping device.

2. Clamping means according to claim 1 wherein said three support cams have respective support faces extending in the same direction, a first and a second support cam of said three support cams having first bearing faces extending in the same direction and perpendicularly to said support faces thereof, one of said first and second support cams having a second bearing face extending perpendicularly to said first bearing faces.

3. Clamping means according to claim 2 wherein the third support cam of said three support cams is disposed at a location spaced from said first and second support cams on the opposite side from said first bearing faces thereof, said third support cam being formed with a laterally offset projection.

4. Clamping means according to claim 3 in combination with a clamping device comprising a retaining pin engageable with said laterally offset projection of said third support cam.

5. Clamping means according to claim 3 in combination with a clamping device comprising respective bearing members engageable with said first bearing faces of said first and second support cams, said second bearing face of said one of said first and second support cams, and said laterally offset projection.

* * * * *